(12) United States Patent
Yates et al.

(10) Patent No.: US 12,522,359 B2
(45) Date of Patent: Jan. 13, 2026

(54) MEAL TABLE WITH ROTATIONAL LIFTING ASSISTANCE

(71) Applicant: B/E Aerospace, Inc., Winston-Salem, NC (US)

(72) Inventors: Zane M. Yates, Clemmons, NC (US); Mark A. Vanhoy, Hamptonville, NC (US); Troy R. Blackburn, Elkin, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 179 days.

(21) Appl. No.: 18/403,090

(22) Filed: Jan. 3, 2024

(65) Prior Publication Data
US 2025/0214709 A1   Jul. 3, 2025

(51) Int. Cl.
*B64D 11/06* (2006.01)
(52) U.S. Cl.
CPC ...... *B64D 11/0605* (2014.12); *B64D 11/0638* (2014.12)
(58) Field of Classification Search
CPC .. A47C 7/626; B64D 11/0605; B64D 11/0638
USPC ................. 297/135, 145, 161, 173
See application file for complete search history.

(56) References Cited

U.S. PATENT DOCUMENTS

| | | | |
|---|---|---|---|
| 5,520,122 A | 5/1996 | Fischer | |
| 5,562,049 A * | 10/1996 | Hoffman | A47B 17/065 297/188.17 |
| 5,573,301 A * | 11/1996 | Scott | A47C 7/68 297/173 |
| 5,653,499 A * | 8/1997 | Goodall | A47B 83/02 297/173 |
| 6,059,357 A * | 5/2000 | Peart | A47C 7/68 297/161 |
| 6,142,559 A * | 11/2000 | Sorel | A47C 7/68 297/411.27 |
| 6,412,862 B1 * | 7/2002 | Dickerson | A47C 7/70 297/161 |
| 6,422,646 B1 * | 7/2002 | McNally | A47C 7/70 297/161 |

(Continued)

FOREIGN PATENT DOCUMENTS

GB   2525381 A  * 10/2015 ............. B60N 3/004

OTHER PUBLICATIONS

European Search Report received in EP Application No. 25150046.8, Mar. 17, 2025, 8 pages.

*Primary Examiner* — Jose V Chen
(74) *Attorney, Agent, or Firm* — Suiter Swantz IP

(57) ABSTRACT

A meal table assembly for use in a seating arrangement including a side console. In embodiments, the meal table assembly includes a fixed column, a sleeve rotatably mounted on the fixed column, a support arm mounted to the sleeve, and a meal table mounted on the support arm. The assembly further includes a rotational lifting mechanism including at least one fixed lateral post mounted to the fixed column, and at least one helical slot provided in the sleeve, wherein the fixed lateral post and the helical slot are configured to interact to synchronize rotational and vertical motion of the sleeve relative to the fixed column. In further embodiments, the assembly may include a lifting mechanism for acting on the sleeve to provide lift assistance.

17 Claims, 10 Drawing Sheets

(56) References Cited

U.S. PATENT DOCUMENTS

| | | | | |
|---|---|---|---|---|
| 6,439,657 B1* | 8/2002 | Tholkes | ................... | A47B 9/02 |
| | | | | 297/423.12 |
| 7,143,701 B2* | 12/2006 | Lindstrom | ............. | B60N 3/002 |
| | | | | 297/145 |
| 7,216,930 B2* | 5/2007 | Steenson | ................ | A47C 7/705 |
| | | | | 297/145 |
| 7,311,354 B2 | 12/2007 | Giasson | | |
| 8,256,835 B2* | 9/2012 | Brink | ....................... | A47C 7/70 |
| | | | | 297/145 |
| 8,596,206 B2* | 12/2013 | Legeay | .............. | B64D 11/0604 |
| | | | | 297/145 |
| 8,668,257 B2* | 3/2014 | Wu | ......................... | A47C 7/70 |
| | | | | 248/446 |
| 8,851,564 B2* | 10/2014 | Seo | ......................... | A47C 7/70 |
| | | | | 297/331 |
| 8,979,190 B2* | 3/2015 | Madrigal | ............... | A47C 7/705 |
| | | | | 297/161 |
| 9,227,816 B2 | 1/2016 | Chen | | |
| 11,230,381 B2 | 1/2022 | Frost et al. | | |
| 11,612,238 B2 | 3/2023 | Schaerer et al. | | |
| 2008/0120785 A1 | 5/2008 | Collins et al. | | |
| 2015/0351528 A1* | 12/2015 | Gow | ..................... | A47B 31/06 |
| | | | | 297/135 |
| 2016/0375810 A1* | 12/2016 | Kong | ..................... | B60N 2/793 |
| | | | | 297/145 |
| 2024/0116636 A1* | 4/2024 | Malecha | ............ | B64D 11/0638 |

* cited by examiner

MEAL TABLE WITH ROTATIONAL LIFTING ASSISTANCE

TECHNICAL FIELD AND BACKGROUND

The present disclosure relates generally to meal tables for aircraft and other conveyances, and more particularly, to a deployable meal table with rotational lifting assistance and counterbalanced motion.

Meal tables are commonly used in aircraft and other conveyances for dining and working. In economy seating classes, meal tables typically deploy from a stowed position against a backrest. In premium seating classes, meal tables may deploy from within an end bay or console.

Meal tables associated with seating arrangements including side consoles typically require that the support arm translate toward and apart from the seat, and the table rotate between a vertical orientation for stowing and a horizontal orientation for deployment. As such, conventional meal table assemblies require horizontal tracks, rotating hinges, and a housing to store the meal table between uses. Such assemblies are complex, consume a significant amount of cabin space to implement, and do not allow the meal table to be usable when stowed.

Therefore, what is needed is a meal table assembly that overcomes the disadvantages of conventional meal table solutions.

BRIEF SUMMARY

According to one aspect, the inventive concepts according to the present disclosure are directed to a meal table assembly including a fixed column, a sleeve rotatably mounted on the fixed column, a support arm mounted at one end to the sleeve, and a meal table mounted on the support arm, and a rotational lifting mechanism. In embodiments, the rotational lifting mechanism includes a fixed lateral post mounted on the fixed column, and a helical slot provided in the sleeve. In use, the fixed lateral post and the helical slot are configured to interact to synchronize rotational and vertical motion of the sleeve relative to the fixed column.

In some embodiments, the rotational lifting mechanism further includes a further fixed lateral post mounted on the fixed column, the further fixed lateral post positioned diametrically opposite the fixed lateral post, a further helical slot provided in the sleeve, the further helical slot positioned diametrically opposite the helical slot, and the further fixed lateral post and the further helical slot configured to interact to synchronize rotational and vertical motion of the sleeve relative to the fixed column.

In some embodiments, the assembly further includes a vertical lifting mechanism including a gas spring disposed vertically in the fixed column, the gas spring including a gas cylinder and a reciprocating piston rod, a lateral post carried by the piston rod, a vertical slot provided in the fixed column, and a horizontal slot provided in the sleeve. In embodiments, the lateral post extends through each of the vertical slot and the horizontal slot such that, in use, the gas spring operates to provide lift assistance to the sleeve, in contact with the lateral post, as the sleeve is rotated in a first direction around the fixed column, and the gas spring operates to store potential energy as the sleeve is rotated in a second direction, opposite the first direction, around the fixed column.

In some embodiments, the vertical lifting mechanism further includes a further lateral post carried by the piston rod, the further lateral post positioned diametrically opposite the lateral post, a further vertical slot provided in the fixed column, the further vertical slot positioned diametrically opposite the vertical slot, and a further horizontal slot provided in the sleeve, the further horizontal slot positioned diametrically opposite the horizontal slot. In embodiments, the further lateral post extends through each of the further vertical slot and the further horizontal slot such that, in use, the gas spring operates to provide lift assistance to the sleeve, in contact with the lateral post and the further lateral post, as the sleeve is rotated in a first direction around the fixed column, and the gas spring operates to store potential energy as the sleeve is rotated in a second direction, opposite the first direction, around the fixed column.

In some embodiments, the meal table assembly further includes a vertical support positioned radially outward of the sleeve, the vertical support including a helical slot, a bracket mounted to the sleeve, the bracket disposed between the sleeve and the vertical support, and a lateral post mounted to the bracket, the lateral post engaged to travel along the helical slot to further synchronize rotational and vertical motion of the sleeve relative to the fixed column.

In some embodiments, the meal table assembly further includes one of a latch and a catch carried by the vertical support and the other of the latch and the catch carried by the bracket, the latch and the catch configured to releasably engage to retain the sleeve at a top of its travel corresponding to a stowed position of the meal table.

In some embodiments, the meal table assembly further includes a top plate attached to each of the fixed column and the vertical support, and a bottom plate attached to each of the fixed column and the vertical support.

In some embodiments, the meal table assembly further includes a plurality of detents formed in an outer circumferential surface of the fixed column, each detent corresponding to a predefined position of the meal table, an opening provided through the sleeve, and a spring lever mounted to the sleeve, the spring lever having one end disposed through the opening provided in the sleeve and configured to releasably engage in one of the plurality of detents to maintain the meal table in the corresponding predefined position.

In some embodiments, the meal table is a bifold table.

According to another aspect, the inventive concepts according to the present disclosure are directed to a seating configuration including a passenger seat, a console positioned to one side of the passenger seat, and a meal table assembly associated with the console. In embodiments, the meal table assembly includes a fixed column disposed within the console, a sleeve rotatably mounted on the fixed column, a support arm mounted at one end to the sleeve, a portion of the support arm extending outside of the console, a meal table mounted on the portion of the support arm extending outside of the console, and a rotational lifting mechanism. In embodiments, the rotational lifting mechanism includes a fixed lateral post mounted on the fixed column, a helical slot provided in the sleeve, and the fixed lateral post and the helical slot configured to interact to synchronize rotational and vertical motion of the sleeve relative to the fixed column.

According to a further aspect, the inventive concepts according to the present disclosure are directed to a console mountable meal table assembly including a fixed cylindrical column, a sleeve rotatably mounted on the fixed cylindrical column, a support arm mounted at one end to the sleeve, a meal table mounted on the support arm, and a rotational lifting mechanism configured to synchronize rotational and vertical motion of the sleeve relative to the fixed cylindrical column.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
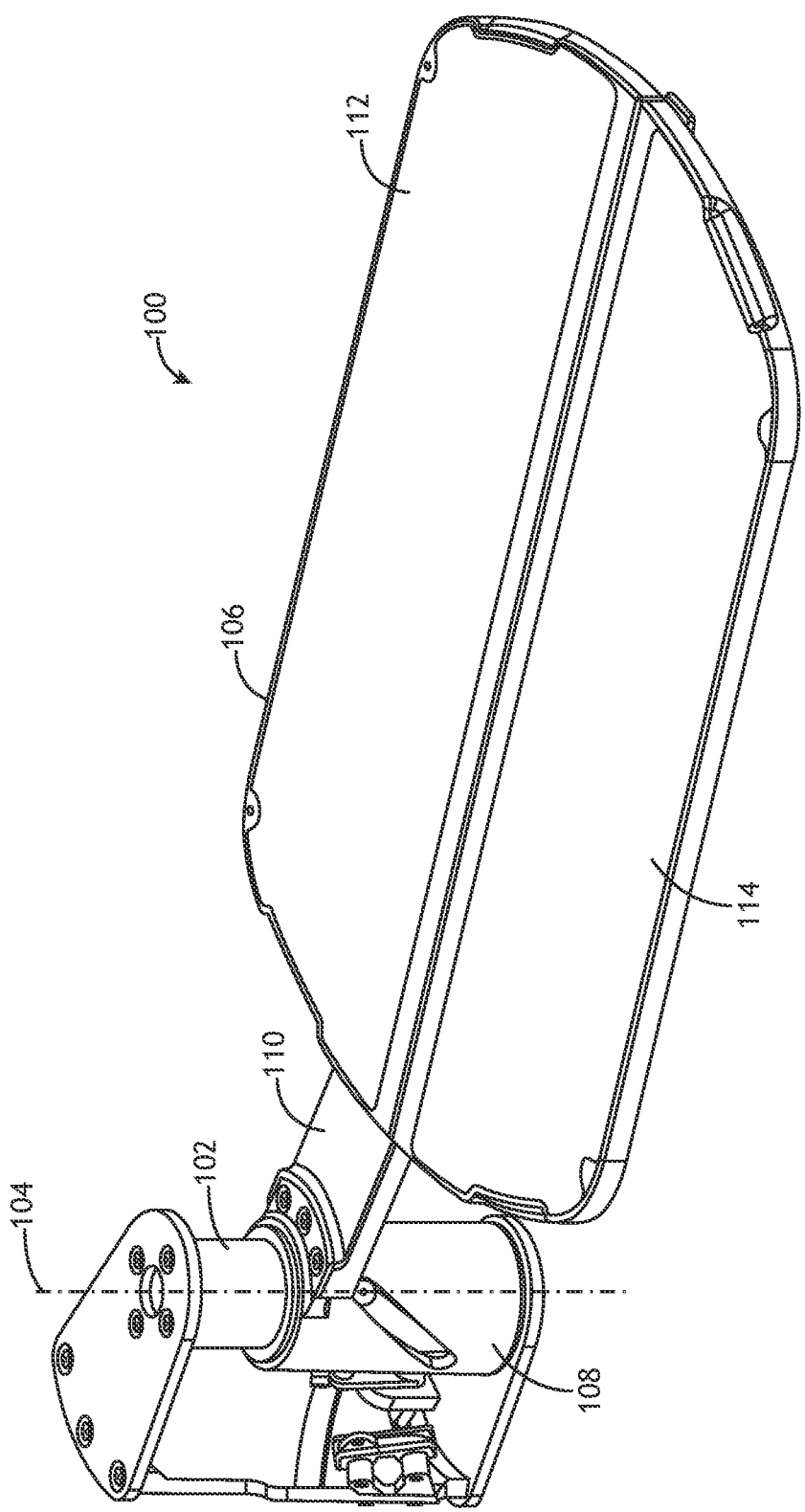
FIG. 1 is an isometric view of a meal table assembly shown from a first perspective, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a meal table assembly configured to be mounted to a console. The meal table is movable between a stowed position to one side of a passenger seat, and a deployed position overlying the passenger seat. The meal table assembly includes a mechanism configured to provide synchronous rotational and vertical motion such that the meal table raises when rotated to the stowed position, and lowers when rotated to the deployed position. The meal table motion is counterbalanced such that the meal table is configured to deploy substantially on its own in a slow dampened manner when unlatched, and feels substantially weightless to the passenger when being manually stowed. The meal table remains substantially horizontal to permit continued use when stowed while still allowing seat egress.

FIG. 1 illustrates a meal table assembly 100 according to the present disclosure. A fixed column 102 defines a vertical axis of rotation 104 about which a meal table 106 rotates or pivots between stowed and deployed positions of the meal table 106. A sleeve 108 is rotatably mounted on the fixed column 102. In embodiments, the fixed column 102 is cylindrical, the sleeve 108 is cylindrical, and the fixed column 102 and the sleeve 108 are arranged concentric to one another. The length of the sleeve 108 is less than the length of the fixed column 102 such that the sleeve 108 is able to travel up and down the fixed column 102 to achieve the stowed and deployed positions as discussed below.

A support arm 110 is mounted at one end to the sleeve 108. The meal table 106 is mounted on the support arm 110. In some embodiments, the meal table 106 may be movably mounted to the support arm 110 such that the meal table 106 can translate 'forward' and 'aft' to provide further adjustability for the meal table 106. Translation may be achieved by a mechanism including guides and tracks that operates independent of the rotational lift assistance of the meal table assembly 100 discussed below. In some embodiments, the meal table 106 may be a bifold configuration including a first table 112 and a second table 114 hinged to the first table 112. In use, the second table 114 may be folded onto the first table 112 when the meal table 106 is stowed, and unfolded from the first table 112 when the meal table 106 is deployed to expand the table surface area.

Figure 2:
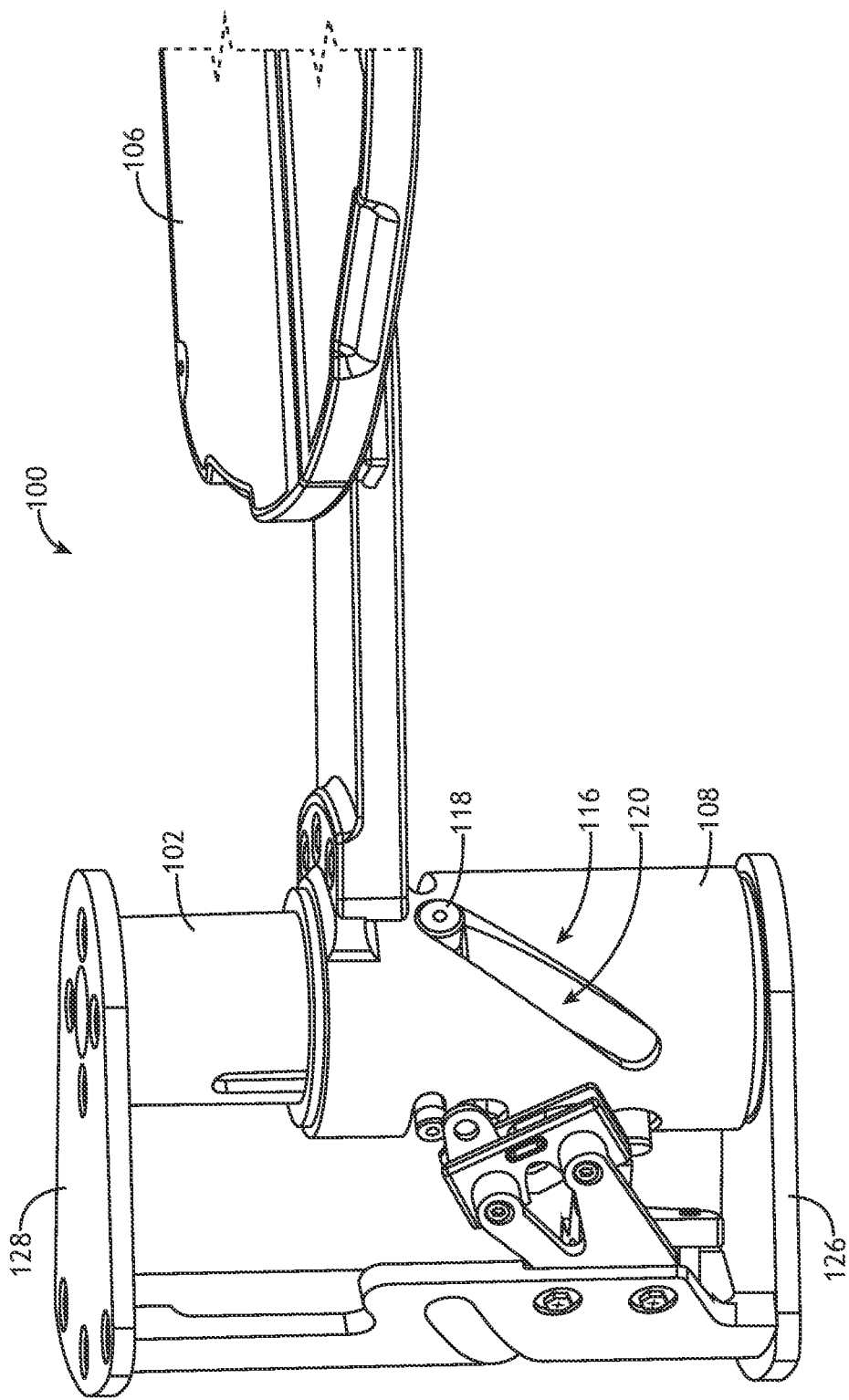
FIG. 2 is a perspective viewing of the meal table assembly showing a first position of the meal table, in accordance with example embodiments of this disclosure.

FIG. 2 illustrates a rotational lifting mechanism 116 by which the fixed column 102 and the sleeve 108 interact to synchronize rotational and vertical motion of the sleeve 108 relative to the fixed column 102. In embodiments, the rotational lifting mechanism 116 includes a fixed lateral post 118 mounted on the fixed column 102, and a helical slot 120 provided or formed in the sleeve 108. In use, the fixed lateral post 118 and the helical slot 120 interact to synchronize the rotational and vertical motion of the sleeve 108 relative to the fixed column 102. In embodiments, the rotational lifting mechanism 116 includes a further fixed lateral post (see 122 in FIG. 7) mounted on the fixed column 102 diametrically opposed to the fixed lateral post 118, and a further helical slot (see 124 in FIG. 7) provided in the sleeve 108 diametrically opposed to the helical slot 120. In other words, the meal table assembly 100 may include a symmetrical arrangement of fixed lateral posts 118, 122 and helical slots 120, 124 configured to act at the same time to synchronize rotational and vertical motion of the sleeve 108 relative to the fixed column 102. In some embodiments, the fixed lateral posts 118, 122 may carry a vertically oriented roller.

FIG. 2 further illustrates a first position of the sleeve 108 corresponding to a deployed condition of the meal table 106. When in the fully deployed condition as shown, the fixed lateral post(s) 118, 122 are positioned at the upper end of their corresponding helical slot(s) 120, 124. In some embodiments, the fully deployed position of the meal table 106 may also coincide with physical contact between the bottom of the sleeve 108 and a top of a lower plate 126 to which the fixed column 102 is mounted. In embodiments, the fixed column 102 is mounted vertically between the lower plate 126 and an upper plate 128 as discussed below.

Figure 3:
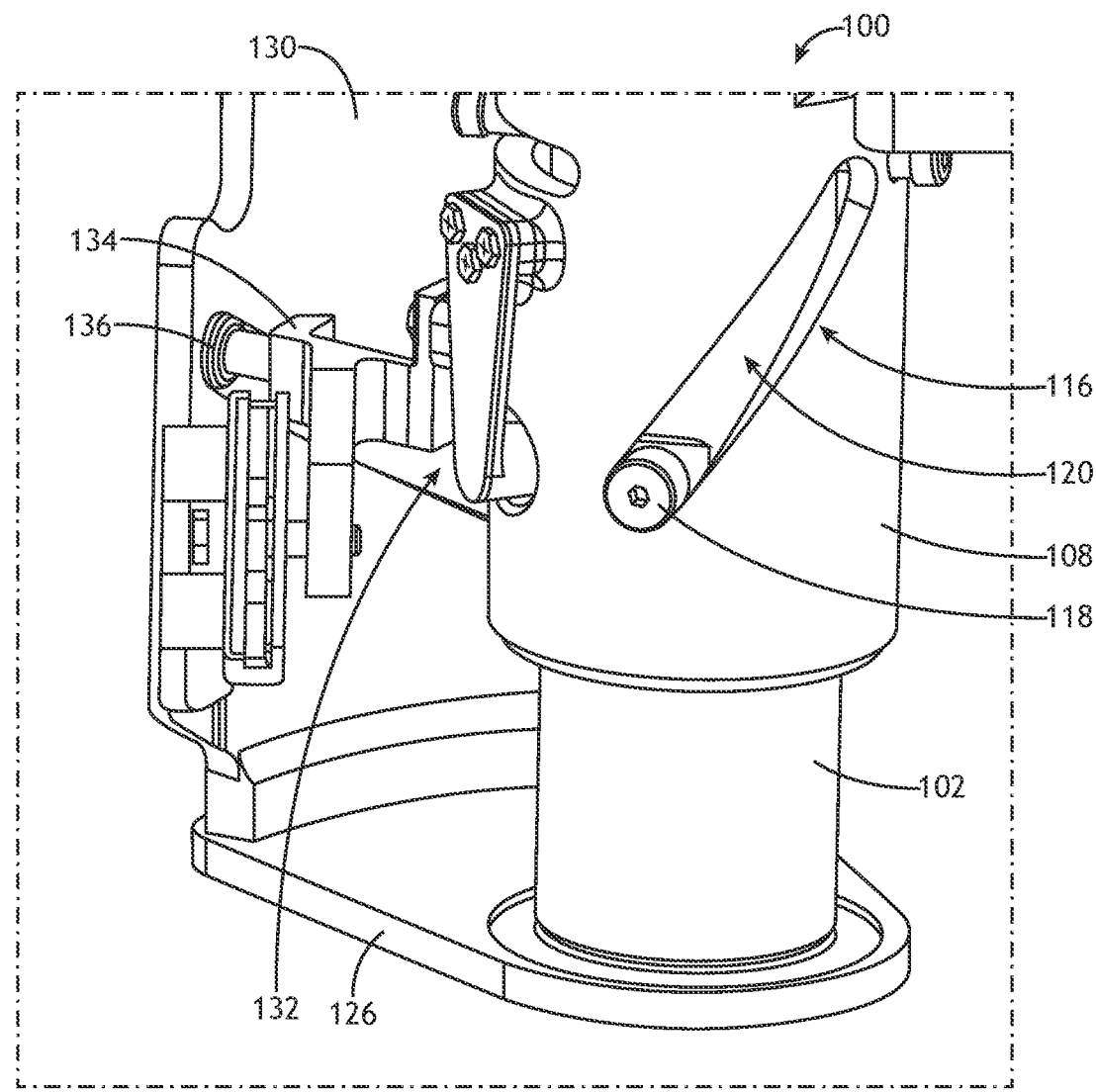
FIG. 3 is a detailed view of the meal table assembly showing a second position of the meal table, in accordance with example embodiments of this disclosure.

FIG. 3 illustrates the rotational lifting mechanism 116 by which the fixed column 102 and the sleeve 108 interact to synchronize rotational and vertical motion of the sleeve 108 relative to the fixed column 102 to move the sleeve 108 to a second position corresponding to a stowed condition of the meal table. In use, the meal table may be manipulated by pushing the meal table away from the passenger (e.g., 'forward' direction), thereby causing the sleeve 108 to rotate around the fixed column 102 and at the same time undergo a vertical position change (e.g., raise) toward the upper plate 128. The length and steepness of the helical slots 120, 124 may be customized to control the angular rotation of the meal table between the fully stowed and fully deployed conditions. In a non-limiting example, the length and steepness of the helical slots 120, 124 may be customized to provide a rotation angle of about 60 degrees and a vertical motion of about 2 inches. In another non-limiting example, from the perspective of the seated passenger, the sleeve 108 may rotate counterclockwise to stow and raise the meal table, and rotate clockwise to deploy and lower the meal table, or vice versa.

FIG. 3 further illustrates an additional support element of the meal table assembly 100. In embodiments, a vertical support 130 is positioned radially outward of the sleeve 108 and includes a further helical slot 132. A bracket 134 may be mounted to the sleeve 108 such that the bracket 134 rotates with the sleeve 108 and is positioned between the sleeve 108 and the vertical support 130. The bracket 134 carries a further lateral post 136 engaged in and configured to travel along the further helical slot 132 to further, guide, support and synchronize the rotational and vertical motion of the sleeve 108 about the fixed column 102.

Figure 4:
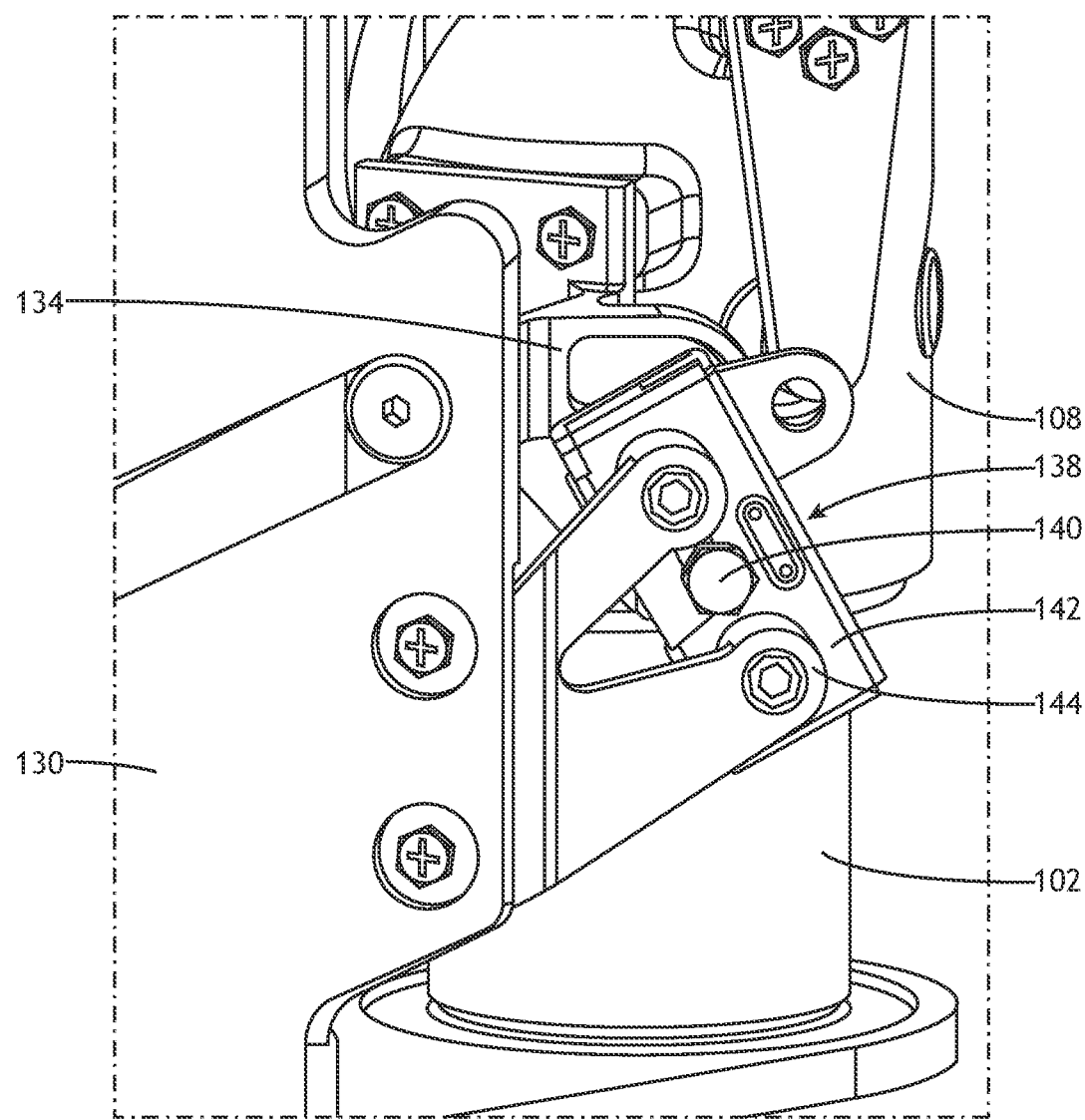
FIG. 4 is a detailed view showing a latch and catch mechanism of the meal table assembly, in accordance with example embodiments of this disclosure.

FIG. 4 illustrates a latch and catch mechanism 138 of the meal table assembly 100 for maintaining the sleeve 108, and consequently the meal table, rotationally fixed relative to the fixed column 102. In embodiments, the latch and catch mechanism 138 includes a latch 140 carried on the bracket 134 such that the latch 140 is configured to rotate with the sleeve 108. A catch 142 is carried by the vertical support 130, for instance through an intermediate bracket 144 attached to the vertical support 130 which is rotationally fixed. In embodiments, the catch 142 may be inclined such that the latch 140 engages in the catch at the end of the 'upward' rotational motion of the sleeve 108 corresponding to the stowed condition of the meal table.

Although not shown, the catch 142 may be released by actuating a release mechanism, for instance an actuator depressed to pull a Bowden cable having one end attached to a movable member of the catch 142. In use, the latch 140 may automatically locate and be received in the catch 142 at the top of the motion, and be actuated to release the latch 140 from the catch 142 to allow the sleeve 108 to rotate the meal table down and toward the passenger.

Figure 5:
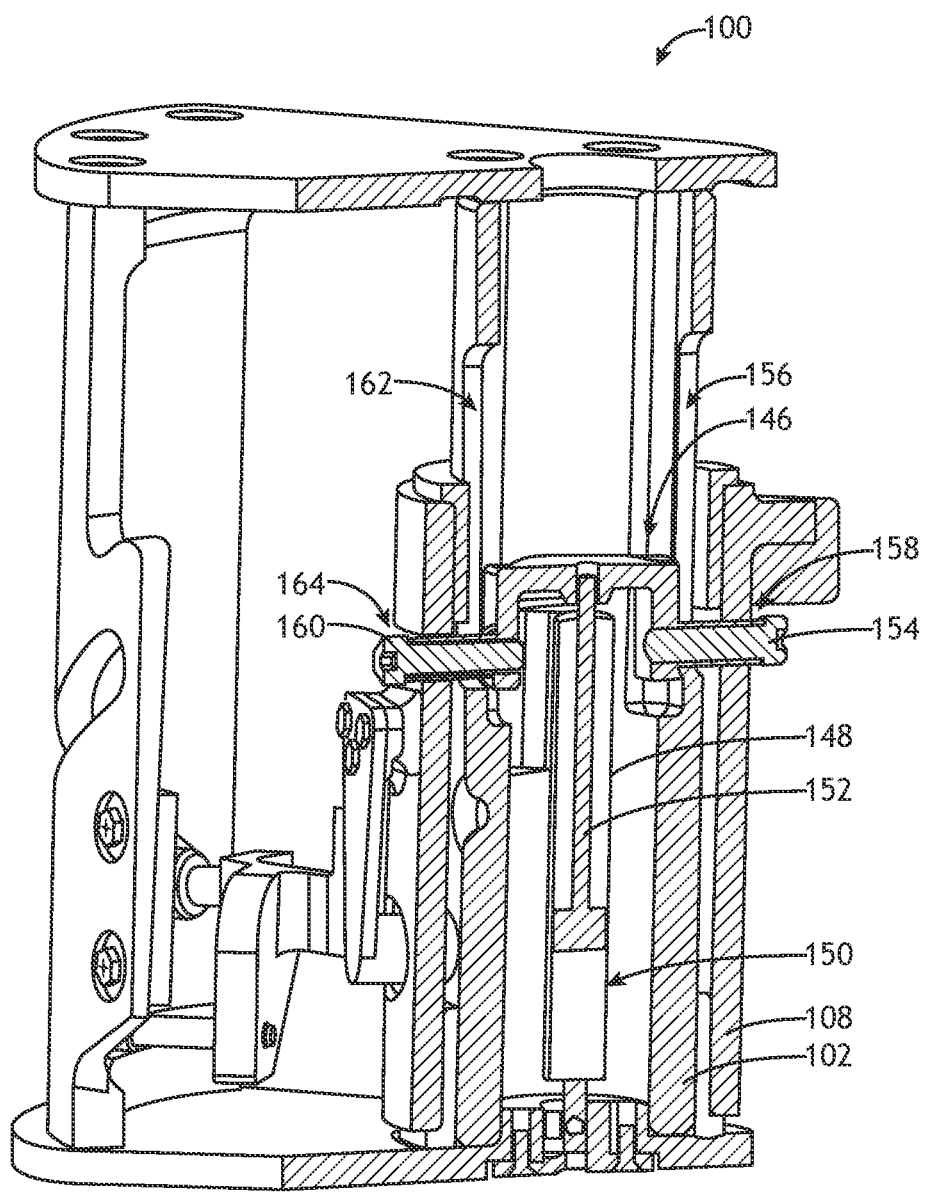
FIG. 5 is a sectional view of the meal table assembly showing a vertical lift mechanism in a first position, in accordance with example embodiments of this disclosure.

FIG. 5 illustrates a vertical lifting mechanism 146 of the meal table assembly 100. In embodiments, a gas spring 148 or like device is disposed vertically in the fixed column 102. The gas spring 148 includes a gas cylinder 150 and a reciprocating piston rod 152. A lateral post 154 is carried by the piston rod 152 and is configured to travel up and down vertically along a vertical slot 156 provided in the fixed column 102. The sleeve 108 further includes a horizontal slot 158. The lateral post 154 extends through each of the vertical slot 156 and the horizontal slot 158, in sequence. In use, the lateral post 154 travels up and down as the sleeve 108 rotates around the fixed column 102 allowable by the horizontal slot 158.

In embodiments, the vertical lifting mechanism 146 may include a further lateral post 160 also carried by the piston rod 152, wherein the further lateral post 160 may be positioned diametrically opposite the lateral post 154. Likewise, a further vertical slot 162 is provided in the fixed column 102 positioned diametrically opposite the vertical slot 156, and a further horizontal slot 164 is provided in the sleeve 108 positioned diametrically opposite the horizontal slot 158. The further lateral post 160 extends through each of the further vertical slot 164 and the further horizontal slot 164.

Figure 6:
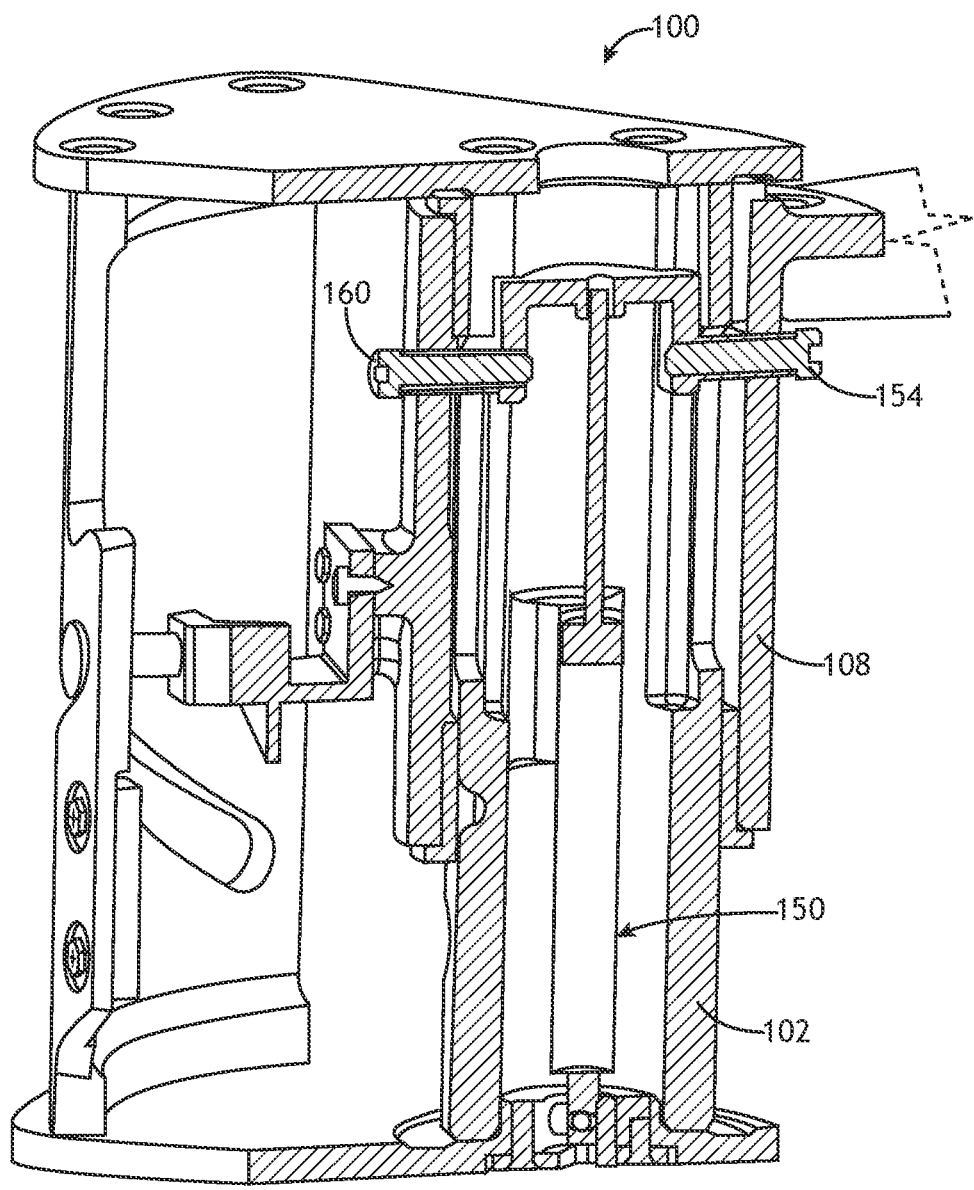
FIG. 6 is a sectional view of the meal table assembly showing the vertical lift mechanism in a second position, in accordance with example embodiments of this disclosure.

Referring to FIGS. 5 and 6, is use, the gas spring 150 operates to provide lift assistance to the sleeve 108, in contact with the lateral post(s) 154, 160, as the sleeve 108 is rotated in a first direction around the fixed column 102, and the gas spring 150 operates to store potential energy as the sleeve 108 is rotated in a second direction, opposite the first direction, around the fixed column 102. For example, the gas springs 150 loads to damper the meal table motion as the meal table rotates and lowers toward the deployed position, and unloads to provide lift assistance as the meal table rotates toward the stowed position.

Figure 7:
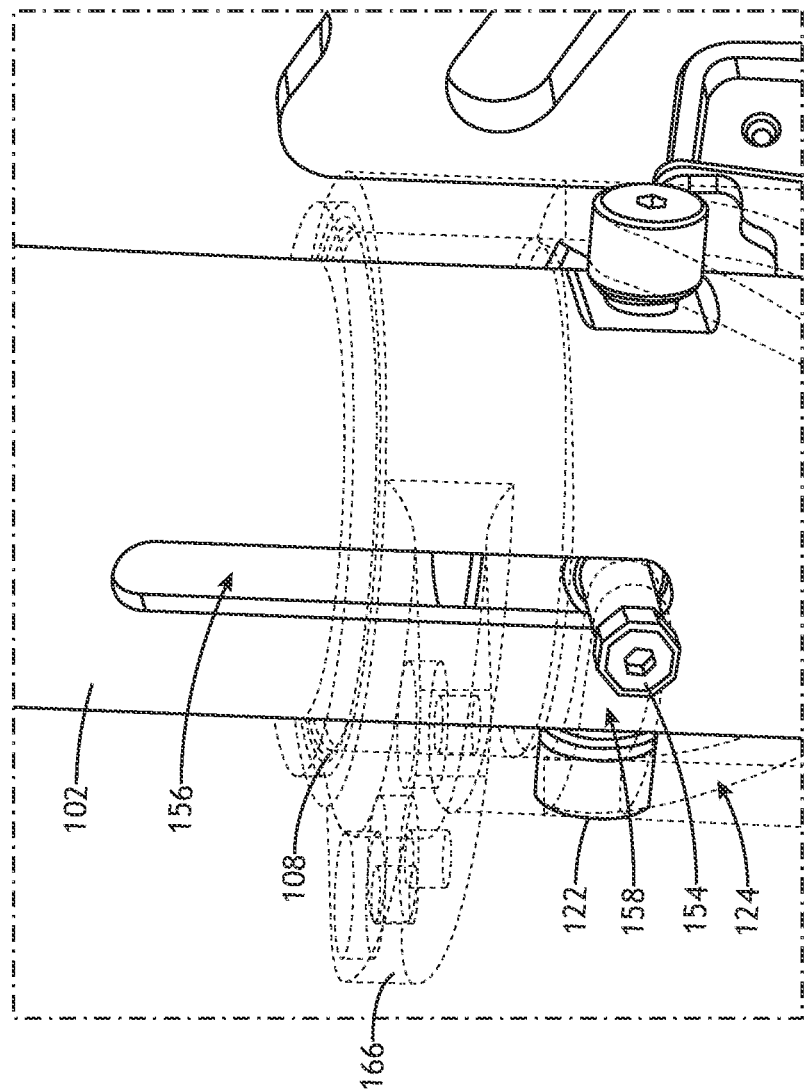
FIG. 7 is a detailed view of the meal table assembly showing features of the vertical lift mechanism, in accordance with example embodiments of this disclosure.

FIG. 7 illustrates the positional relationships between the vertical slot 156 formed in the fixed column 102, the lateral post 154 carried by the piston rod, and the horizontal slot 158 formed in the sleeve 108. Each of the vertical slot 156 and the horizontal slot 158 has a length and relative position which allows the lateral post 154 to travel up and down vertically and the sleeve 108 to rotate around the fixed column 108. In embodiments, each of the slot lengths as described herein may be 'matched' such that the respective posts travel the full length of the slots as the table moves between the fully stowed and fully deployed positions. The sleeve 108 may further include a lateral feature for attaching the support arm to the sleeve 108.

Figure 8:
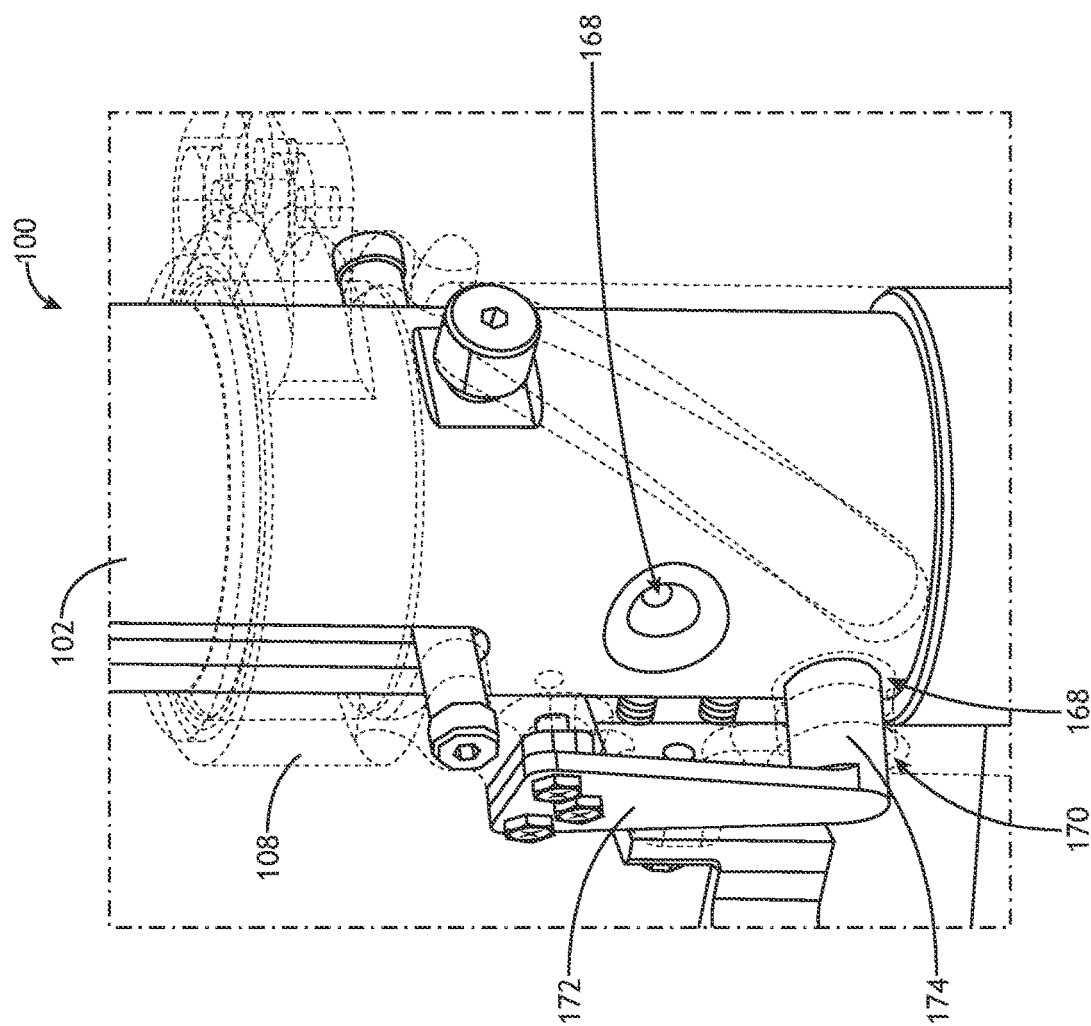
FIG. 8 is a detailed view of the meal table assembly showing a lever and detent configuration for maintaining meal table positions, in accordance with example embodiments of this disclosure.

FIG. 8 illustrates a locating feature of the meal table assembly 100. In embodiments, the locating feature includes a plurality of detents 168 formed in an outer circumferential surface of the fixed column 102. Each detent corresponds to a predefined position of the meal table. An opening 170 is provided through the sleeve 108. A spring lever 172 is mounted to the sleeve 108, and includes a detached end 174 disposed through the opening 170 provided in the sleeve 108 and configured to releasably engage in one of the plurality of detents 168 at a time to maintain the meal table in the corresponding predefined position. In embodiments, the detached end 174 may be rounded and the detents 168 correspondingly shaped such that the detached end 174 self-locates in the respective detent 168 and releases from the respective detent by the pushing or pulling force on the meal table. In embodiments, detents 168 may be positioned at the top, the bottom, and in at least one intermediate position of the meal table, corresponding to the stowed, deployed, and intermediate positions of the meal table.

Figure 9:
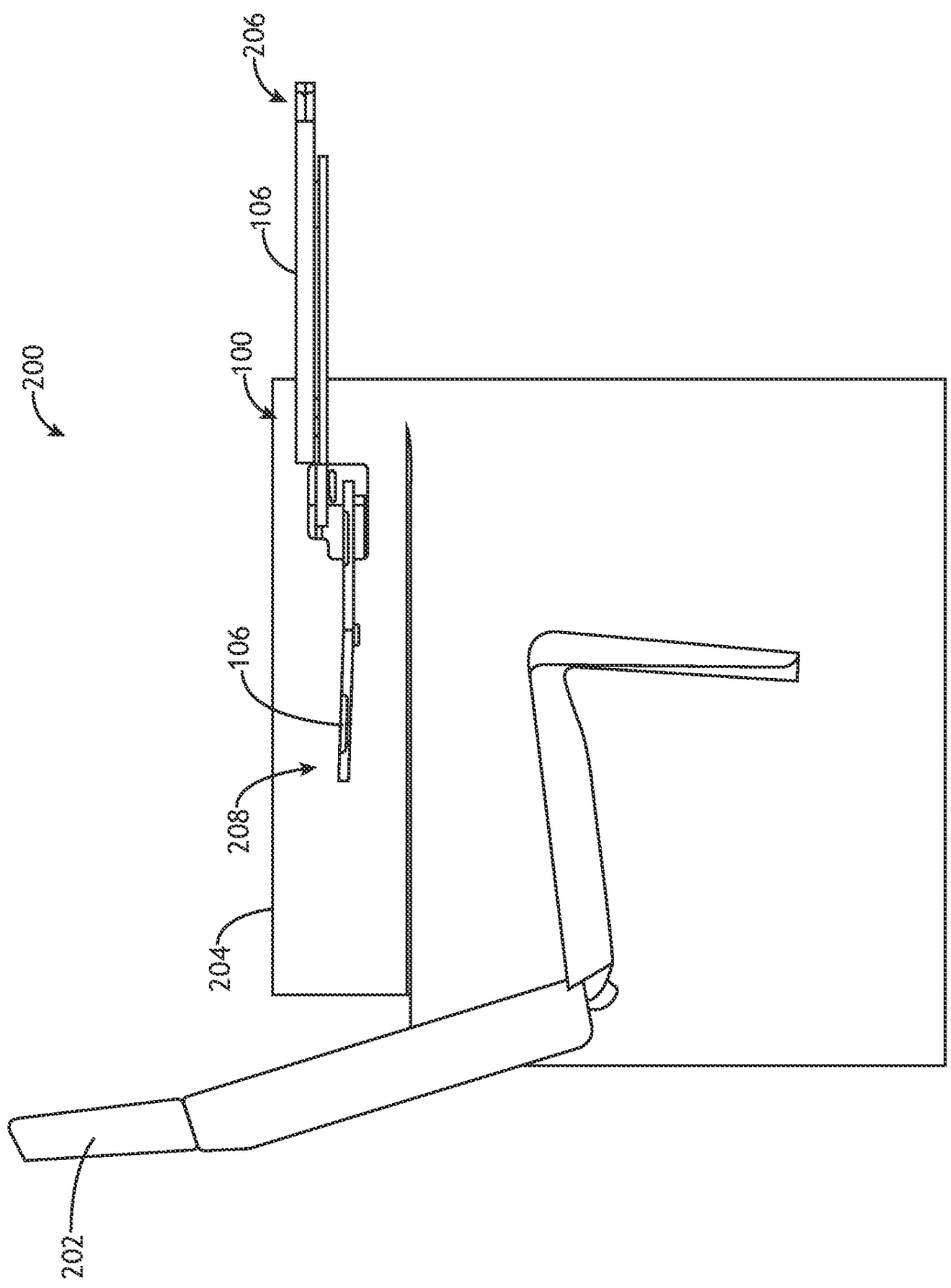
FIG. 9 is a side elevation view showing the meal table assembly in the context of a seating arrangement, in accordance with example embodiments of this disclosure.
Figure 10:
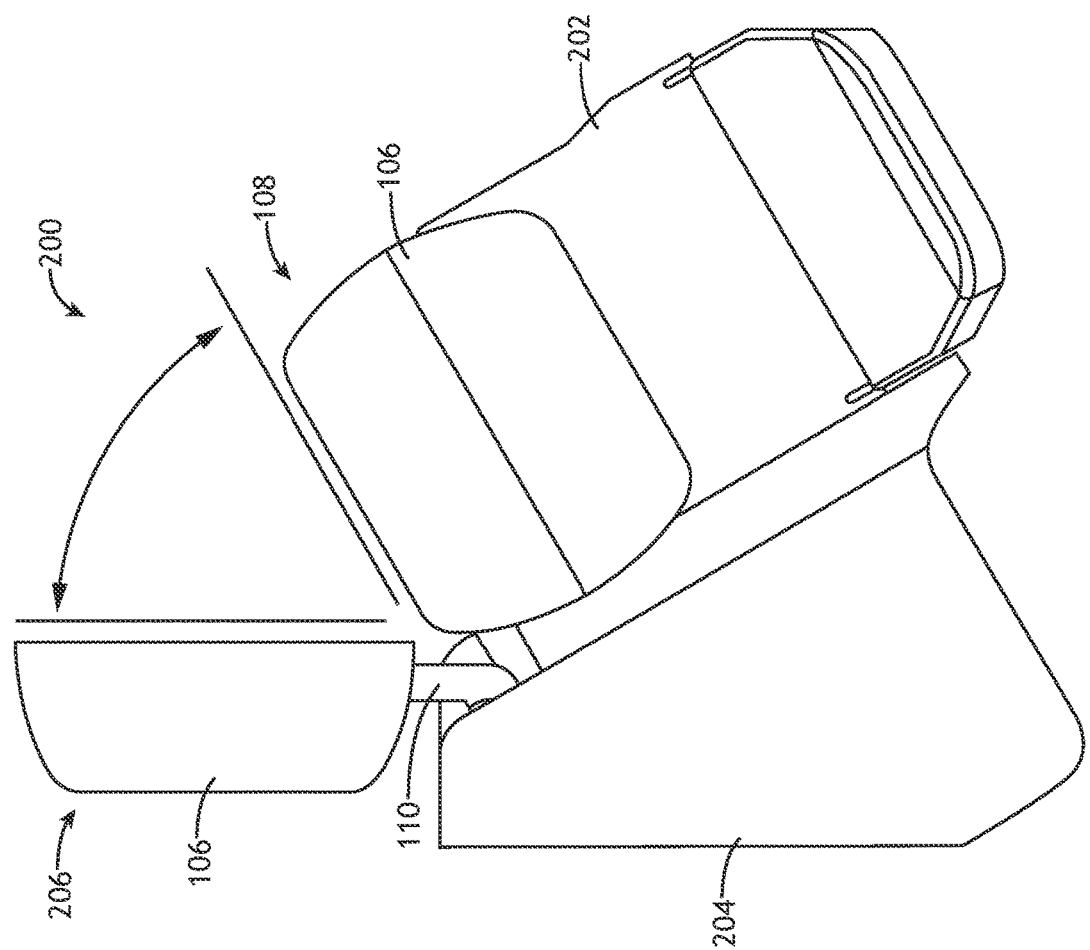
FIG. 10 is a top plan view showing the meal table in each of stowed and deployed positions, in accordance with example embodiments of this disclosure.

FIGS. 9 and 10 illustrate the meal table assembly 100 in the context of a passenger seating arrangement 200. In a non-limiting example, the passenger seating arrangement 200 includes a passenger seat 202, a console 204 positioned to one side of the passenger seat 202, and the meal table assembly 100 mounted to the console 204. In embodiments, the lower and upper plates 126, 128 shown in FIG. 2 may be upper and lower console portions to which the assembly components are attached. The console 204 may include a lateral slot through which the support arm 110 extends outside of the console 204. In this configuration, the majority of the meal table assembly 100 is housed and concealed within the console 204.

FIG. 9 shows the upper and lower relative positions of the meal table 106 in each of the stowed position 206 and the deployed position 208. FIG. 10 shows the stowed and deployed positions 206, 208. In embodiments, the passenger seat 202 may be angled relative to the aircraft longitudinal axis, the console 204 may be positioned along the fuselage wall or adjacent another seat console, and the meal table 106 stows forward of and generally to one side of the passenger seat 202. In addition, the meal table 106 may be folded when stowed and unfolded when deployed.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A meal table assembly, comprising:
   a fixed column;
   a sleeve rotatably mounted on the fixed column;
   a support arm mounted at one end to the sleeve;
   a meal table mounted on the support arm; and
   a rotational lifting mechanism comprising:
      a fixed lateral post mounted on the fixed column;
      a helical slot provided in the sleeve;
      the fixed lateral post and the helical slot configured to interact to synchronize rotational and vertical motion of the sleeve relative to the fixed column;
      a further fixed lateral post mounted on the fixed column, the further fixed lateral post positioned diametrically opposite the fixed lateral post;
      a further helical slot provided in the sleeve, the further helical slot positioned diametrically opposite the helical slot; and
      the further fixed lateral post and the further helical slot configured to interact to synchronize rotational and vertical motion of the sleeve relative to the fixed column.

2. The meal table assembly according to claim 1, further comprising a vertical lifting mechanism, comprising:
   a gas spring disposed vertically in the fixed column, the gas spring including a gas cylinder and a reciprocating piston rod;
   a lateral post carried by the piston rod;
   a vertical slot provided in the fixed column; and
   a horizontal slot provided in the sleeve;
   wherein:
      the lateral post extends through each of the vertical slot and the horizontal slot;
      in use, the gas spring operates to provide lift assistance to the sleeve, in contact with the lateral post, as the sleeve is rotated in a first direction around the fixed column; and
      in use, the gas spring operates to store potential energy as the sleeve is rotated in a second direction, opposite the first direction, around the fixed column.

3. The meal table assembly according to claim 2, further comprising:
   a further lateral post carried by the piston rod, the further lateral post positioned diametrically opposite the lateral post;
   a further vertical slot provided in the fixed column, the further vertical slot positioned diametrically opposite the vertical slot; and
   a further horizontal slot provided in the sleeve, the further horizontal slot positioned diametrically opposite the horizontal slot;
   wherein:
      the further lateral post extends through each of the further vertical slot and the further horizontal slot;
      in use, the gas spring operates to provide lift assistance to the sleeve, in contact with the lateral post and the further lateral post, as the sleeve is rotated in a first direction around the fixed column; and
      in use, the gas spring operates to store potential energy as the sleeve is rotated in a second direction, opposite the first direction, around the fixed column.

4. The meal table assembly according to claim 1, further comprising:
a vertical support positioned radially outward of the sleeve, the vertical support including a helical slot;
a bracket mounted to the sleeve, the bracket disposed between the sleeve and the vertical support; and
a lateral post mounted to the bracket, the lateral post engaged to travel along the helical slot to further synchronize rotational and vertical motion of the sleeve relative to the fixed column.

5. The meal table assembly according to claim 4, further comprising:
one of a latch and a catch carried by the vertical support; and
the other of the latch and the catch carried by the bracket;
the latch and the catch configured to releasably engage to retain the sleeve at a top of its travel corresponding to a stowed position of the meal table.

6. The meal table assembly according to claim 4, further comprising:
a top plate attached to each of the fixed column and the vertical support; and
a bottom plate attached to each of the fixed column and the vertical support.

7. The meal table assembly according to claim 1, further comprising:
a plurality of detents formed in an outer circumferential surface of the fixed column, each detent corresponding to a predefined position of the meal table;
an opening provided through the sleeve; and
a spring lever mounted to the sleeve, the spring lever having one end disposed through the opening provided in the sleeve and configured to releasably engage in one of the plurality of detents to maintain the meal table in the corresponding predefined position.

8. The meal table assembly according to claim 1, wherein the meal table is a bifold table.

9. A seating configuration, comprising:
a passenger seat;
a console positioned to one side of the passenger seat; and
a meal table assembly associated with the console, the meal table assembly comprising:
a fixed column disposed within the console;
a sleeve rotatably mounted on the fixed column;
a support arm mounted at one end to the sleeve, a portion of the support arm extending outside of the console;
a meal table mounted on the portion of the support arm extending outside of the console; and
a rotational lifting mechanism comprising:
a fixed lateral post mounted on the fixed column;
a helical slot provided in the sleeve; and
the fixed lateral post and the helical slot configured to interact to synchronize rotational and vertical motion of the sleeve relative to the fixed column;
wherein:
a stowed configuration of the meal table corresponds to a meal table position forward of the passenger seat;
a deployed configuration of the meal table corresponds to a meal table position over the passenger seat; and
a motion path of the meal table between the stowed configuration and the deployed configuration includes synchronous rotational and vertical motion.

10. The seating configuration according to claim 9, wherein the rotational lifting mechanism further comprises:
a further fixed lateral post mounted on the fixed column, the further fixed lateral post positioned diametrically opposite the fixed lateral post;
a further helical slot provided in the sleeve, the further helical slot positioned diametrically opposite the helical slot; and
the further fixed lateral post and the further helical slot configured to interact to synchronize rotational and vertical motion of the sleeve relative to the fixed column.

11. The seating configuration according to claim 10, the meal table assembly further comprising a vertical lifting mechanism, comprising:
a gas spring disposed vertically in the fixed column, the gas spring including a gas cylinder and a reciprocating piston rod;
a lateral post carried by the piston rod;
a vertical slot provided in the fixed column; and
a horizontal slot provided in the sleeve;
wherein:
the lateral post extends through each of the vertical slot and the horizontal slot;
in use, the gas spring operates to provide lift assistance to the sleeve, in contact with the lateral post, as the sleeve is rotated in a first direction around the fixed column; and
in use, the gas spring operates to store potential energy as the sleeve is rotated in a second direction, opposite the first direction, around the fixed column.

12. The seating configuration according to claim 11, further comprising:
a further lateral post carried by the piston rod, the further lateral post positioned diametrically opposite the lateral post;
a further vertical slot provided in the fixed column, the further vertical slot positioned diametrically opposite the vertical slot; and
a further horizontal slot provided in the sleeve, the further horizontal slot positioned diametrically opposite the horizontal slot;
wherein:
the further lateral post extends through each of the further vertical slot and the further horizontal slot;
in use, the gas spring operates to provide lift assistance to the sleeve, in contact with the lateral post and the further lateral post, as the sleeve is rotated in a first direction around the fixed column; and
in use, the gas spring operates to store potential energy as the sleeve is rotated in a second direction, opposite the first direction, around the fixed column.

13. The seating configuration according to claim 9, further comprising:
a vertical support disposed within the console and positioned radially outward of the sleeve, the vertical support including a helical slot;
a bracket mounted to the sleeve, the bracket disposed between the sleeve and the vertical support; and
a lateral post mounted to the bracket, the lateral post engaged to travel along the helical slot to further synchronize rotational and vertical motion of the sleeve relative to the fixed column.

14. The seating configuration according to claim 13, further comprising:
one of a latch and a catch carried by the vertical support; and
the other of the latch and the catch carried by the bracket;

the latch and the catch configured to releasably engage to retain the sleeve at a top of its travel corresponding to a stowed position of the meal table.

15. The seating configuration according to claim 13, further comprising:
    a top plate attached to each of the fixed column and the vertical support;
    a bottom plate attached to each of the fixed column and the vertical support; and
    each of the top plate and the bottom plate being part of the console.

16. The seating configuration according to claim 9, further comprising:
    a plurality of detents formed in an outer circumferential surface of the fixed column, each detent corresponding to a predefined position of the meal table;
    an opening provided through the sleeve; and
    a spring lever mounted to the sleeve, the spring lever having one end disposed through the opening provided in the sleeve and configured to releasably engage in one of the plurality of detents to maintain the meal table in the corresponding predefined position.

17. A console mountable meal table assembly, comprising:
    a fixed cylindrical column;
    a sleeve rotatably mounted on the fixed cylindrical column;
    a support arm mounted at one end to the sleeve;
    a meal table mounted on the support arm;
    a rotational lifting mechanism comprising:
        diametrically opposed fixed lateral posts mounted on the fixed cylindrical column;
        diametrically opposed helical slots provided in the sleeve; and
        the fixed lateral posts and the helical slots configured to interact to synchronize rotational and vertical motion of the sleeve relative to the fixed cylindrical column; and
    a vertical lifting mechanism, comprising:
        a gas spring disposed vertically in the fixed cylindrical column, the gas spring including a gas cylinder and a reciprocating piston rod;
        diametrically opposed lateral posts carried by the piston rod;
        diametrically opposed vertical slots provided in the fixed column; and
        diametrically opposed horizontal slots provided in the sleeve;
    wherein:
    the lateral posts extend through each of their respective vertical slot and horizontal slot;
    in use, the gas spring operates to provide lift assistance to the sleeve, in contact with the lateral posts, as the sleeve is rotated in a first direction around the fixed cylindrical column; and
    in use, the gas spring operates to store potential energy as the sleeve is rotated in a second direction, opposite the first direction, around the fixed cylindrical column.

* * * * *